United States Patent
Margalit

(10) Patent No.: US 6,671,437 B2
(45) Date of Patent: Dec. 30, 2003

(54) METHOD AND DEVICE FOR TUNABLE FREQUENCY SELECTIVE FILTERING OF OPTICAL SIGNALS

(75) Inventor: Moti Margalit, Zichron Yaaqov (IL)

(73) Assignee: Lambda Crossing Ltd., Caesaria (IL)

( * ) Notice: Subject to any disclaimer, the term of this patent is extended or adjusted under 35 U.S.C. 154(b) by 0 days.

(21) Appl. No.: 10/140,757

(22) Filed: May 8, 2002

(65) Prior Publication Data

US 2003/0210860 A1 Nov. 13, 2003

(51) Int. Cl.$^7$ .................................................. G02B 6/26
(52) U.S. Cl. ............................. 385/40; 385/11; 385/14; 385/24; 385/37; 385/39; 385/41; 385/131; 385/132; 398/53; 398/65; 398/83; 398/84; 398/85
(58) Field of Search ........................... 385/11, 14, 15, 385/24, 37, 39, 40, 41, 131, 132; 398/53, 65, 83, 84, 85

(56) References Cited

U.S. PATENT DOCUMENTS

| | | | |
|---|---|---|---|
| 5,351,317 A | | 9/1994 | Weber ............................. 385/3 |
| 5,710,849 A | * | 1/1998 | Little et al. .................... 385/50 |
| 5,917,970 A | * | 6/1999 | Burns et al. ................... 385/24 |
| 6,025,943 A | | 2/2000 | Meekers et al. ............. 359/128 |
| 6,067,391 A | * | 5/2000 | Land ............................. 385/27 |
| 6,097,518 A | | 8/2000 | Wu et al. ..................... 359/128 |
| 6,212,315 B1 | | 4/2001 | Doerr ........................... 385/31 |
| 6,222,964 B1 | * | 4/2001 | Sadot et al. ................... 385/40 |
| 6,285,810 B1 | * | 9/2001 | Fincato et al. ................. 385/24 |
| 6,292,299 B1 | | 9/2001 | Liou ........................... 359/583 |
| 6,411,756 B2 | * | 6/2002 | Sadot et al. ................... 385/40 |

FOREIGN PATENT DOCUMENTS

| | | | | |
|---|---|---|---|---|
| EP | 1 130 432 | 9/2001 | ............... | 385/37 X |
| EP | 1 158 342 | 11/2001 | ............... | 385/37 X |
| EP | 1 241 497 | 9/2002 | ............... | 385/37 X |

OTHER PUBLICATIONS

Terahara et. al., "Tunable Optical Filter", U.S. patent appl. Pub. No.U.S.2001/0010593A1, published Aug. 2, 2001.*
Sadot et. al., "Ultra–Fast Tunable Optical Filters", U.S. patent appl. No.U.S. 2001/002287A1, published Sep. 20, 2001.*
Nykolak, G., et al. "All–Fiber Active Add–Drop Wavelength Router" *IEEE Photonics Technology Letter*, vol. 9, No. 5, p. 605–606, (1997).
Ahn, S., et al. "Grating–Assisted Codirectional Coupler Filter Using Electrooptic and Passive Polymer Waveguides" *IEEE J. on Selected Topics in Quantum Electronics*, vol. 7, No. 5, p. 819–825, (2001).

* cited by examiner

Primary Examiner—Brian Healy
(74) Attorney, Agent, or Firm—Ladas & Parry

(57) ABSTRACT

Method and device are presented for controlling continuous propagation of input multi-frequency light through a tunable frequency selective optical filter so as to selectively direct a selected frequency band of the input light to a dropping/adding output channel of the device. Selective frequency coupling is applied to the input light to split it into first and second light components propagating through first and second spatially separating optical paths, respectively, such that the first light component comprises at least a portion of power of the selected frequency band of the input light, and the second light component comprises the remaining portion of the input light. A phase delay between the first and second optical paths is selectively created by adjusting the phase of the first light component. Then, depending on the phase of the first light component, either the first and second light components are combined to propagate through a first output channel with substantially no power in the second dropping/adding output channel, or all the power of the selected frequency band is directed through the second dropping/adding output channel while all other frequency components of the input light are directed through the first output channel.

11 Claims, 2 Drawing Sheets

METHOD AND DEVICE FOR TUNABLE FREQUENCY SELECTIVE FILTERING OF OPTICAL SIGNALS

FIELD OF THE INVENTION

This invention is generally in the field of optical devices and relates to a method and device for the tunable frequency selective filtering of optical signals, particularly useful for adding or dropping channels in a wavelength division multiplexing optical communication system.

BACKGROUND OF THE INVENTION

Optical transmission systems, which are based on wavelength division multiplexing (WDM), achieve high information capacities by aggregating many optical channels onto a single strand of optical fiber. Tunable filters play a critical role in WDM communication systems. A tunable filter, which can redirect and route wavelengths, is used in conjunction with tunable lasers to create a tunable transmitter, midway in the fiber in wavelength for add and drop multiplexing applications, and at the receiving end in conjunction with a broad band detector for a tunable receiver.

In applications of add and drop multiplexing, the tunable filter is often termed a three (or more) port device, with an input, express, and drop (add) ports. In these applications, the network traffic enters the device at the input, with most of the channels leaving at the express port. The dropped channels are redirected to the drop port, while the added channels are input from the add port. During all times, the network is operational, and in particular, when tuning the filter from one channel to another, a critical feature of the filter is termed "hitless tuning", which is the ability to tune from one channel to another without disturbing ("hitting") any of the express channels, since this would constitute a traffic disruption in the network.

Tunable filters in state of art implementations fall under the following two categories:

(1) Tunable filters based on spatial distribution of the different channels and switching of the channels to be dropped. Here, tunability is achieved by applying spatially distinct switches, which switch different channels to the drop port.

(2) Tunable filters based on a change in the frequency of operation by physical changes in the optical filter medium. These are the so-called "scanning" tunable filters", since they scan over frequencies.

Hitless tuning can easily be achieved in the first implementation. However, the first implementation suffers from many other drawbacks, especially energy loss, cross talk, and price, all of which make its use difficult for optical networks. The second type of filter is a preferred solution for most optical networks.

U.S. Pat. No. 6,292,299 describes a hitless wavelength-tunable optical filter, which includes an add/drop region and a broadband optical reflector adjacent thereto. The operation of the filter is based on selectively repositioning an optical signal in the add/drop region while adding or dropping an optical wavelength channel, and on the use of a broadband optical reflector, while tuning to a different optical wavelength channel.

"All fiber active add drop multiplexer" [IEEE Photonics Technology Letter, Vol. 9, No. 5 p 605] describes an architecture to be used as a reconfigurable router for exchanging channels between two fibers or as a reconfigurable add/drop multiplexing filter. The architecture consists of a Mach-Zender interferometer with identical gratings written in each arm, one pair of grating for each wavelength to be added or dropped. Each grating pair is also accompanied by a phase shifter, which is a thermo-optic heater.

SUMMARY OF THE INVENTION

There is a need in the art to facilitate the tuning of a frequency selective filter by providing a novel optical method and device for continuously flowing light through the frequency selective filter. The frequency selective filter may perform wavelength dropping or adding function.

The present invention utilizes separating at least a portion of the power of a selected frequency component from the remaining portion of the multi-frequency input light signal and directing the separated light components along two spatially separated optical paths, creating a phase delay between these optical paths by affecting the phase of the light component of said at least portion of the selected frequency band. This enables to either direct all the frequency components of the input light to a common first output channel with no power in a second output channel, or direct the entire power of the selected frequency band and all other frequencies along, respectively, the second and first output channels, depending on the phase delay between the two spatially separated optical paths. Thus, on one operational mode of the device according to the invention, all the input light is output in one channel, while the other output channel serving for dropping or adding function is inoperative, and in the other operational mode of the device, the selected frequency band is fully spatially separated from all other frequencies, and can therefore be either dropped or added to another optical signal.

The above is implemented by passing the input light through a first tunable frequency coupling element having two input ports, of which one is used for receiving the input multi-frequency light and the other is unconnected. The coupler further has two output ports associated with two spatially separated optical paths (waveguides). The optical path difference between the spatially separated waveguides can be adjusted by various well-established means. The phase difference can be adjusted between zero path difference, both waveguides having exactly the same optical length, and 1800 path difference, the optical length difference between the waveguides being equal to half the wavelength. The two waveguides are input into a second, reciprocal frequency-coupling element, which has two inputs and two outputs. The light input from both ports is recombined in the coupler, whereas in the first coupler, only one input port was active and in the second coupler both input ports are active and the combination of the two ports in the second coupler depends on the relative phase of the input ports.

The phase delay between the two spatially separated optical paths can be continuously adjustable up to 180°. The output at the second coupling element depends in a continuous manner on the phase delay between the two spatially separated optical paths, such that for a zero phase delay between the optical paths, the tunable selected frequency band of the input light is in one output channel of the device, and the remaining spectral content is in the other output channel, while for a 180° phase delay, substantially all the input light is in the same output channel.

At intermediate phase states, the amount of light at the selected frequency band is selectively variable. Selective dropping of a portion of the energy of a given frequency band is known as "optical broadcast functionality" and is useful in instances where the optical signal has to reach more than one destination node.

There is thus provided according to one aspect of the present invention, a method for controlling continuous propagation of input multi-frequency light through a tunable frequency selective optical filter device so as to selectively direct a selected frequency band of the input light to a dropping/adding output channel of the device, the method comprising:

(i) applying selective frequency coupling to the input light to split the input multi-frequency light into first and second light components propagating through first and second spatially separating optical paths, respectively, the first light component comprising at least a portion of power of the selected frequency band of the input light, and the second light component comprising a remaining portion of the selected frequency band and all other frequency bands of the input light;

(ii) selectively creating a phase delay between the first and second optical paths by adjusting the phase of said first light component;

(iii) depending on the phase of said first light component, either combining the first and second light components to propagate through a first output channel with substantially no power in the second dropping/adding output channel, or directing all the power of the selected frequency band through the second dropping/adding output channel while directing all other frequency components of the input light through the first output channel.

According to another aspect of the present invention, there is provided a method for controlling continuous propagation of input multi-frequency light through a tunable frequency selective optical filter device so as to selectively direct to a selected frequency band of the input light to a dropping/adding output channel of the device, the method comprising:

splitting the input multi-frequency randomly polarized light into first and second spatially separated components of orthogonal polarization directions and directing the first and second polarization components along first and second spatially separated channels, respectively;

applying a 90° polarization rotation to either one of the two polarization components, thereby producing two identically linearly polarized components;

applying a selective frequency coupling to each of the two identically linearly polarized components to produce first and second light components propagating through first and second spatially separating optical paths, respectively, wherein the first light component comprises at least a portion of power of the selected frequency band of the input light, and the second light component comprises the remaining portion of the input light;

selectively creating a phase delay between the first and second optical paths by adjusting the phase of said first light component;

depending on the phase of said first light component, either combining the first and second light components to propagate through a first output channel with substantially no power in the second dropping/adding output channel, or directing all the power of the selected frequency band through the second dropping/adding output channel while directing all other frequency components of the input light through the first output channel.

According to yet another aspect of the present invention, there is provided a tunable frequency selective optical filter device operable to provide continuous propagation of input multi-frequency light through the device enabling to selectively direct a selected frequency band of the input light to a dropping/adding output channel of the device, the device comprising:

(a) a first tunable frequency coupling element having an input for receiving the multi-frequency input light and two outputs associated with two spatially separated optical paths, respectively, the first coupling element being operable to split the input light into two light components propagating through said first and second optical paths, respectively, the first light component comprising at least a portion of power of a selected frequency band of the input light, and the second light component comprising the remaining portion of the input light;

(b) a phase adjusting element accommodated in the first optical path and operable to affect the phase of light propagating therethrough, thereby adjusting a phase delay between the first and second optical paths;

(c) a second tunable frequency coupling element having two inputs associated with the two optical paths, respectively, and first and second outputs associated with first and second output channels, respectively, the second frequency coupling element being responsive to the phase delay to either combine the first and second light components to propagate through the first output channel, or direct all the power of the selected frequency band to the second dropping/adding output channel and direct all other frequency components of the input light to the first output channel.

Each of the first and second tunable frequency coupling elements can be realized using a grating assisted coupler (GAC) ["Grating-Assisted Codirectional Coupler Filter Using Electrooptic and Passive Polymer Waveguides", Seh-Won, Ahn and Sang-Yung Shin, IEEE Journal on Selected Topics in Quantum Electronics, Vol. 7, No. 5, September/October 2001, pp. 819–825] that transfers light of a specific frequency band from one output of the coupler to the other, or can be realized by using any other suitable coupler device, for example, of the kind whose physical parameters, such as the length, the strength of coupling between the two optical paths, and the phase difference across the coupling length, define the amount of transferred energy.

BRIEF DESCRIPTION OF THE DRAWINGS

In order to understand the invention and to see how it may be carried out in practice, a preferred embodiment will now be described, by way of non-limiting to example only, with reference to the accompanying drawings, in which.

DETAILED DESCRIPTION OF THE INVENTION

Figure 1:
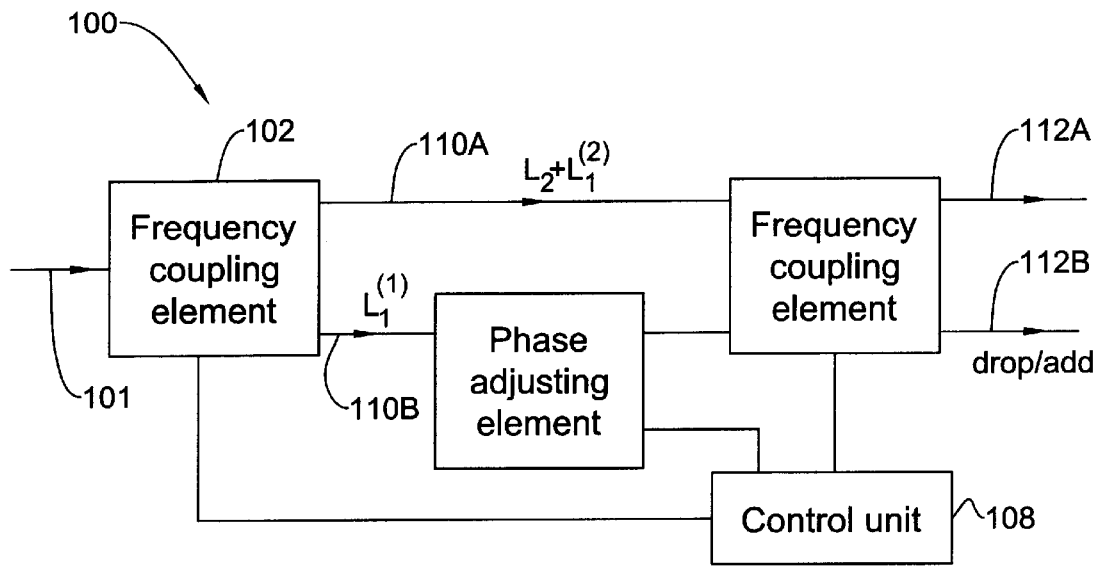
FIG. 1 is a block diagram of an optical device according to the invention.

Referring to FIG. 1, there is illustrated an optical device, generally designated 100, which, according to the invention, is operable as a tunable frequency selective filter for selectively performing a dropping or adding function during the continuous passage of light through the device. The device 100 comprises a first tunable frequency coupling element 102, a phase adjusting element 104, and a second tunable frequency coupling element 106, all operated by a control unit 108.

The element 102 has two input waveguides of which one is active as an input port for receiving multi-frequency input multi-frequency light 101A (either free propagating or from an input waveguide), and two outputs associated with two spatially separated optical paths (waveguides) 110A and 110B. The element 106 (which is a reciprocal of the element 102) has two inputs associated with the waveguides 110A and 110B, and two outputs associated with two output channels (waveguides) 112A and 112B. One of the output channels (channel 112B in the present example) functions as a dropping or adding channel.

Each of the elements 102 and 106 is operable to transfer at least a portion of power of a selected frequency band of the input light to the optical path 110B while allowing propagation of the remaining portion of the input light (i.e., remaining portion of the selected frequency band and all other frequency bands of the input light) through the optical path 110A. Each of the elements 102 and 106 can be realized using a GAC known as transferring light of a specific frequency band from one output channel to the other.

Figure 2:
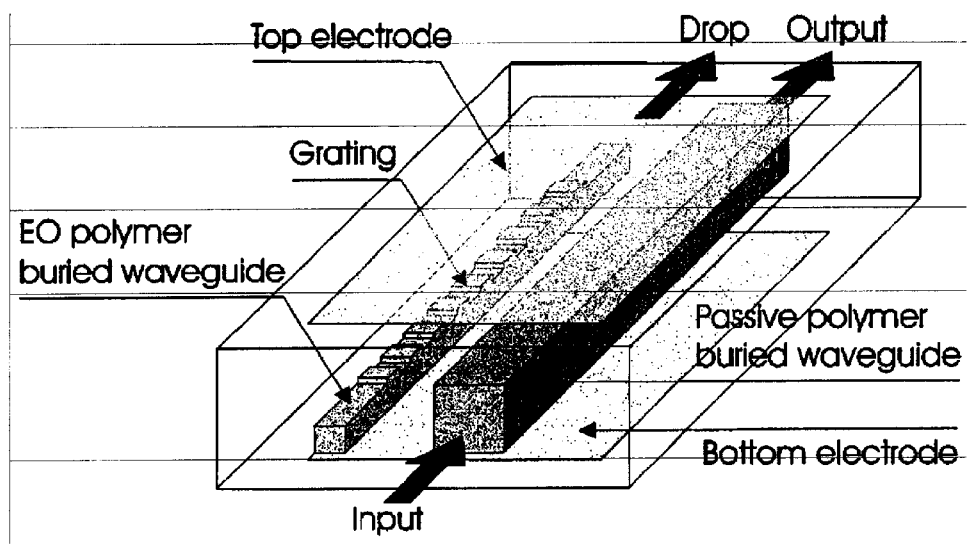
FIG. 2 is a schematic illustration of a prior art GAC device suitable to be used in the device of the present invention.

FIG. 2 illustrates a prior art GAC device described in the above-indicated article "Grating-Assisted Codirectional Coupler Filter Using Electrooptic and Passive Polymer Waveguides", which is suitable for use as the elements 102 and 106 in the device 100. As shown in the figure, the GAC device ("band-rejection filter") has buried polymer waveguides, one being the passive polymer waveguide used for the input and the output ports, and the other being the electrooptical (EO) polymer waveguide used as a drop port. Power coupling is achieved by using the diffraction grating etched on top of the EO polymer waveguide. Maximal coupling occurs at a wavelength $\lambda_0$ that satisfies the phase-match condition $|N_2-N_1|_{=\lambda 0}/\Lambda$, wherein $N_2$ and $N_1$ are the effective indexes of the two respective waveguide modes and $\Lambda$ is the grating period. Satisfaction of the phase-match condition enables strong coupling when the lightwave from one waveguide adds in-phase to the other waveguide and weak coupling when it adds out-of-phase. Therefore, the optical power can flow substantially to the other waveguide. The optical input launched into the passive polymer waveguide is coupled to the EO polymer waveguide at the wavelength $\lambda_0$, whereas it just passes through the passive polymer waveguide at other wavelengths.

It should be understood that a coupling element of any other suitable kind can be used as well to implement the elements 102 and 106, for example the coupling elements whose physical parameters, such as the length of the coupler, the strength of coupling between the waveguides, and the phase difference across the coupling length, define the amount of transferred energy.

Thus, the first frequency coupling element 102 directs at least a part $L^{(1)}_1$ of a selected frequency band $F_1$ of the input light 101 to the optical paths 110A and 110B, while directing light $L_2$ of the other frequency bands $F_2$ of the input light and a remaining part $L^{(2)}_1$ of the selected frequency band $F_1$ (in the case of incomplete transfer of light of the selected frequency band) to the second optical path. The power ratio $(L^{(2)}_1/L^{(1)}_1)$ of the selected frequency band $F_1$ in the paths 110A and 110B depends on the selected wavelength and the GAC parameters. In the present example, the frequency coupling element 102 operates to transfer half of the power of the specific frequency band $F_1$ to the waveguide 110B. The input light portion $L_2$ outside the selected (coupling) frequency band exists in one of the waveguides 110A and 11B only (waveguide 110A in the present example), and the power of light within the coupling frequency band $F_1$ is equally distributed between the waveguides 110A and 110B: $L^{(2)}_1$ in waveguide 110A and $L^{(1)}_1$ in waveguide 110B. The phase adjusting element 104 is placed on the waveguide 110B and is selectively operated by the control unit 108 to affect the phase of light propagating therethrough to enable a continuously adjustable phase delay up to 180° between the optical paths 110A and 110B. The optical phase may be changed by applying an electric field and using the electroptic effect, using a resistive heater and the thermo-optic effect, current injection in a semiconductor material, as well as piezo or other mechanical effects. At the reciprocal frequency coupling element 106, the relative phase between the two input arms 110A and 110B defines the energy buildup in the coupler. As for the first coupler 102, here only a select band of frequencies interacts across the coupler length. Hence, the unselected frequencies, which are coming across only the first waveguide 110A, pass through the coupler to the output waveguide, which constitutes the express output. The selected frequency band arrives at both input ports of the coupler 106 with a relative phase difference. Since the coupler is a linear optical element, each input can be treated separately. If the coupler 106 acts similar to the couple 102, to couple half of the input light to each of the output waveguides 112A and 112B, then in each of the output channels the light from each of the inputs will be equal in amplitude. If the phase difference is zero, constructive interference will cause the light of the selected frequency band to be located in the drop port 112B, and not in the express port 112A. If the phase difference is 180°, then destructive interference will cause the selected frequency band to be located in the express port 112A and not in the drop port 112B.

In one operational mode of the device 100, the element 104 is operated to appropriately affect the phase of light passing therethrough. The light $L_2$ of frequency bands other than the coupling frequency band is unaffected by any phase changes, since this light exists in the waveguide 110A only, while that half of light of the coupling frequency band $L^{(1)}_1$ which propagates through the waveguide 110B undergoes phase changes. In this operational mode, light $L^{(1)}_1$ coming from the waveguide 110B is out-of-phase, and the element 106 transfers this light to the output channel 112A. Hence, the entire input light is output at the waveguide 112A, and no light exists in the output dropping/adding channel 112B, the dropping/adding function of the device 100 being therefore inoperative in this operational mode of the device 100.

In the other operational mode of the device 100, when the dropping/adding functional of the device is to be performed, the element 104 is in its inoperative position, not affecting the phase of light passing therethrough. As a result, light $L^{(1)}_1$ coming from the waveguide 110B is in-phase with light of the selected frequency band $L^{(2)}_1$ in the waveguide 110A, and the element 106 transfers the light portion $L^{(2)}_1$ of the coupling frequency band to the output channel 112B. As a result, the entire light of the coupling frequency band $F_1$ passes through the output channel 112B spatially separated from all other frequency components of the input light passing through the output channel 112A.

Thus, when the tuning of the device 100 to adjust a desired frequency band for separation (dropping/adding) is carried out (i.e., the adjustment of the operation of the coupling elements 102 and 106), the element 104 is operated to create the phase delay between the channels 110A and 110B, and all the input light 102 is output at the channel 112A. When the tuning is completed, the element 104 is shifted into its inoperative state, and the desired frequency band is separated to the dropping/adding output channel 112B. By this, the hitless tuning of the device 100 is provided.

Preferably, the tunable device is realized in a planar lightwave circuit (PLC) technique that has an inherent advantage in the integration of complex optical functions. Light-paths are preferably realized using waveguides in which the refractive index of a core region, where light is guided, is higher than the refractive index of a cladding region. Light is typically introduced into the tunable device by coupling an optical fiber to the input waveguide of the device.

Figure 3:
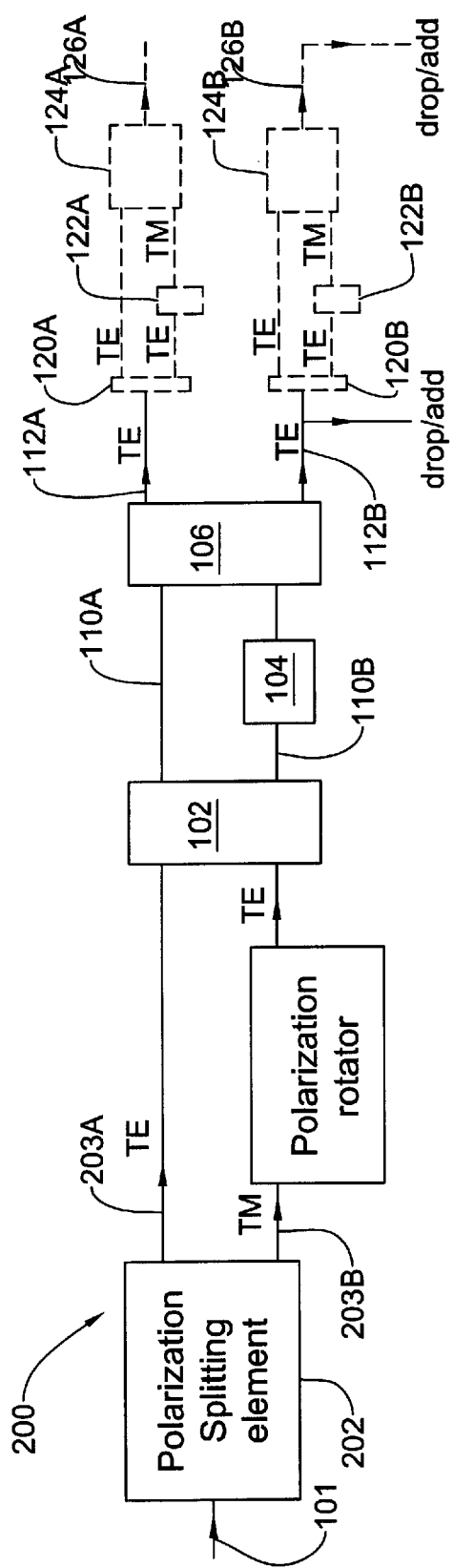
FIGS. 3 and 4 are schematic illustrations of two examples, respectively, of an optical device according to the invention utilizing a polarization affecting function.

Reference is made to FIG. 3, illustrating a frequency selective filter device 200 according to the invention, which is generally similar to the above-described device 100, but is somewhat modified to perform a polarization affecting function to thereby enable operation with linearly polarized light, which is often required in integrated optics. To facilitate understanding, the same reference numbers are used for identifying those components, which are similar in the devices 100 and 200. Thus, the device 200, in addition to the device 100, comprises a polarization splitting element 202 and a 90° polarization rotating element 204. The element 202, which is a polarizer beam splitter or calcite, is accommodated in the path of the input multi-frequency randomly polarized light 101 and splits the input light 101 into two light components of the orthogonal polarization directions TE and TM propagating along two spatially separated optical paths (waveguides) 203A and 203B. The element 204 (e.g., a half-wave plate) is accommodated in either one of the paths 203A and 203B—in the path 203B in the present example, and rotates the polarization of light passing therethrough into the orthogonal one. Thus, two identically linearly polarized light components, pass through the first frequency coupling element 102, which transfers at least a portion of power of the selected frequency band of the input light to the optical path 110B and allows propagation the remaining portion of the input light along the optical path 110A. The element 104 selectively creates the phase delay between the paths 110A and 110B, thereby enabling the selective-frequency transfer by the second frequency coupling element 106, to either output all the input light at the channel 112A or separate the selected frequency band at the dropping/adding channel 112B.

As further shown in FIG. 3 in dashed lines, if the randomly polarized output of the device 200 is to be provided (rather than the linearly polarized output), the following can be performed: Elements 120A and 122B are accommodated in the channels 112A and 112B, respectively, each for splitting light propagating through the respective channel into a pair of spatially separated light components, 90° polarization rotating elements 122A and 122B are accommodated in the path of one of the light components in the two pairs, respectively, and polarization combining elements 124A and 124B are provided for combining respective orthogonal polarization components. This combination results in two output channels 126A and 126B—the channel 126B selectively operating (depending on the phase delay between the optical paths 110A and 110B) as the dropping/adding channel.

Figure 4:
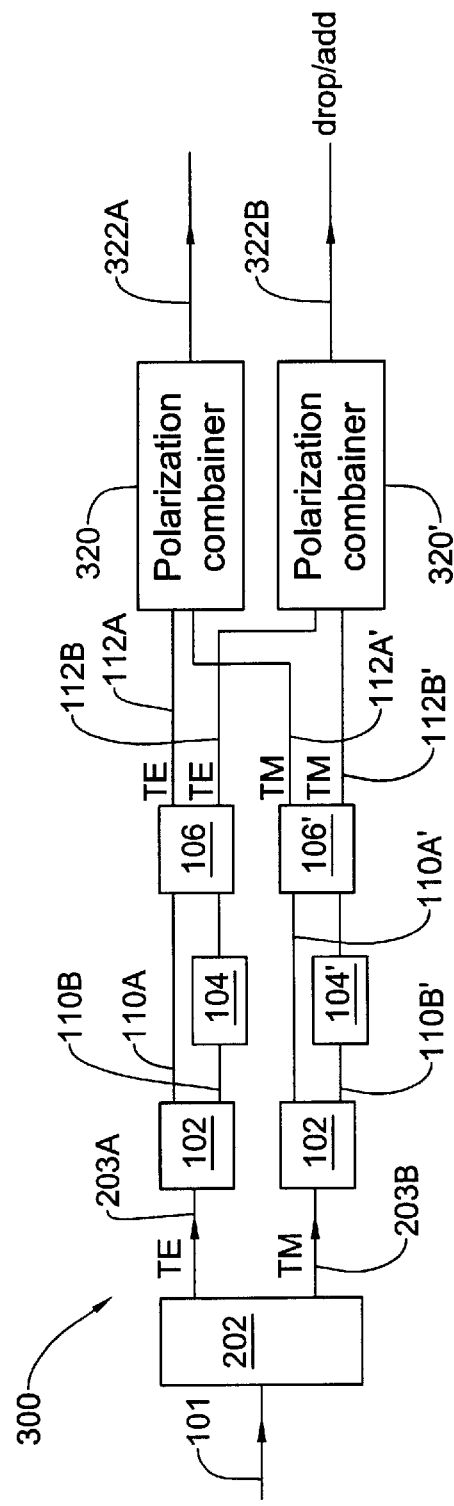

Turning now to FIG. 4, there is illustrated a frequency selective filter 300 according to yet another example of the invention, intended for separate operation with both linear polarizations. Similarly, the same reference numbers are used for identifying components that are common in all the examples of the invention. In the device 300, the multi-frequency randomly polarized input light 101 is split by the element 202 into two orthogonal polarization components TE and TM propagating along, respectively, two spatially separated optical paths 203A and 203B, each optical path being loaded with the filter device similar to that described above with reference to FIG. 1: the optical path 203A is loaded with the device 100 and the optical path 203B is loaded with the similar device denoted 100'. The devices 100 and 101 differ from each other in that their frequency coupling elements are capable of processing light of different linear polarization directions. Additionally, two polarization combining elements 320 and 320' are provided defining output channels 322A and 322B, respectively, wherein the output channel 322B serves for the dropping/adding function. The element 320 combines the output channels 112A and 112A' of the devices 100 and 100', respectively, and the element 320' combines the output channels 112B and 112B' of the devices 100 and 100', respectively.

In one operational mode of the device 300, when the phase adjusting elements 104 and 104' are both operative to create the phase delays between, respectively, the channels 110A–110B, and 110A'–110B', all the input light is output at the channel 322A. In the other operational mode, the phase adjusting elements 104 and 104' are both inoperative, and the entire power of the selected frequency band and all other frequencies of the input light are output at channels 322B and 322A, respectively.

Those skilled in the art will readily appreciate that various modifications and changes can be applied to the embodiments of the invention as hereinbefore exemplified without departing from its scope defined in and by the appended claims.

What is claimed is:

1. A method for controlling continuous propagation of input multi-frequency light through a tunable frequency selective optical filter device so as to selectively direct a selected frequency band of the input light to a dropping/adding output channel of the device, the method comprising:

(i) applying selective frequency coupling to the input light to split the input multi-frequency light into first and second light components propagating through first and second spatially separated optical paths, respectively, the first light component comprising at least a portion of power of the selected frequency band of the input light, and the second light component comprising a remaining portion of the selected frequency band and all other frequency bands of the input light;

(ii) selectively creating a phase delay between the first and second optical paths by adjusting the phase of said first light component;

(iii) depending on the phase of said first light component, either combining the first and second light components to propagate through a first output channel with substantially no power in the second dropping/adding output channel, or directing all the power of the selected frequency band through the second dropping/adding output channel while directing all other frequency components of the input light through the first output channel.

2. The method according to claim 1, comprising splitting a multi-frequency randomly polarized input light signal into two spatially separated input light components of orthogonal polarization directions, and applying a 90° polarization rotation to either one of the two input light components, thereby producing said multi-frequency input light in the form of two spatially separated linearly polarized light components.

3. The method according to claim 2, comprising:

splitting light in each of the first and second output channels into first and second spatially separated light signals, thereby producing two pairs of output light signals of different linear polarization directions, respectively;

applying a 90° polarization rotation to the first light signal in each pair, thereby producing a first pair of light signals with orthogonal polarization directions and a second pair of light signals with orthogonal polarization directions; and combining the light signals of orthogonal polarization directions in the first pair into a first output path, and combining the light signals of orthogonal polarization directions in the second pair into a second output path;

the method thereby providing either outputting substantially all the input light in the first output path, or outputting the selected frequency band and the remaining frequencies of the input light in, respectively, the second and the first output paths, depending on the phase of said first light component.

4. The method according to claim 1, comprising applying a polarization splitting to a multi-frequency randomly polarized input light signal, thereby producing said multi-frequency input light in the form of two spatially separated input light components of orthogonal polarization directions;

applying steps (i)–(iii) to each of said two spatially separated input light components of orthogonal polarization directions, thereby defining two pairs of the first and second output channels, the first and second output channels of one pair for output light of one linear polarization direction, and the first and second output channels of the other pair for outputting light of the other linear polarization direction; and combining the first channels of the two pairs into a first output path for outputting randomly polarized light, and combining the second channels of the two pairs into a second output path for outputting randomly polarized light;

the method thereby providing either outputting substantially all the input light in the first output path, or outputting the selected frequency band and the remaining frequencies of the input light in, respectively, the second and the first output paths, depending on the phase of said first light component.

5. A method for controlling continuous propagation of input multi-frequency light through a tunable frequency selective optical filter device so as to selectively direct a selected frequency band of the input light to a dropping/adding output channel of the device, the method comprising:

splitting the input multi-frequency randomly polarized light into first and second spatially separated components of orthogonal polarization directions and directing the first and second polarization components along first and second spatially separated channels, respectively;

applying a 90° polarization rotation to either one of the two polarization components, thereby producing two identically linearly polarized components;

applying a selective frequency coupling to each of the two identically linearly polarized components to produce first and second light components propagating through first and second spatially separating optical paths, respectively, wherein the first light component comprises at least a portion of power of the selected frequency band of the input light, and the second light component comprises the remaining portion of the input light;

selectively creating a phase delay between the first and second optical paths by adjusting the phase of said first light component;

depending on the phase of said first light component, either combining the first and second light components to propagate through a first output channel with substantially no power in the second dropping/adding output channel, or directing all the power of the selected frequency band through the second dropping/adding output channel while directing all other frequency components of the input light through the first output channel.

6. A tunable frequency selective optical filter device operable to provide continuous propagation of input multi-frequency light through the device enabling to selectively direct a selected frequency band of the input light to a dropping/adding output channel of the device, the device comprising:

(a) a first tunable frequency coupling element having an input for receiving the multi-frequency input light and two outputs associated with two spatially separated optical paths, respectively, the first coupling element being operable to split the input light into two light components propagating through said first and second optical paths, respectively, the first light component comprising at least a portion of power of a selected frequency band of the input light, and the second light component comprising the remaining portion of the selected frequency band an all other frequency bands of the input light;

(b) a phase adjusting element accommodated in the first optical path and operable to affect the phase of light propagating therethrough, thereby adjusting a phase delay between the first and second optical paths;

(c) a second tunable frequency coupling element having two inputs associated with the two optical paths, respectively, and first and second outputs associated with first and second output channels, respectively, the second frequency coupling element being responsive to the phase delay to either combine the first and second light components to propagate through the first output channel, or direct all the power of the selected frequency band to the second dropping/adding output channel and direct all other frequency components of the input light to the first output channel.

7. The device according to claim 6, wherein the second tunable frequency coupling element is a reciprocal of the first tunable frequency coupling element.

8. The device according to claim 6, wherein each of the4 first and second tunable frequency coupling elements is a grating assisted coupler.

9. The device according to claim 6, wherein a polarization splitting element is accommodated in the optical path of a multi-frequency randomly polarized input light signal propagating towards the first tunable frequency coupling element, the polarization splitting element splitting the input light signal into two spatially separated input light components of orthogonal polarization directions, and a 90° polarization rotation element is accommodated in the optical path of one of the two spatially separated input light components of orthogonal polarization directions, said multi-frequency input light inputting the first tunable frequency coupling element thereby being in the form of two spatially separated linearly polarized light components.

10. The device according to claim 9, wherein additional first and second polarization splitting elements are accommodated in the first and second output channels, respectively, to thereby produce two pairs of output light signals of different linear polarization directions, respectively;

additional first and second 90° polarization rotating elements are accommodated in the optical path of the first light signals in two pairs, respectively, to thereby produce a first pair of light signals with orthogonal polarization directions and a second pair of light signals with orthogonal polarization directions; and first and second polarization combiners are provided, the first polarization combiner combining the light signals of orthogonal polarization directions in the first pair into a first output path, and the second polarization combiner combining the light signals of orthogonal polarization directions in the second pair into a second output path.

11. The device according to claim 6, wherein:

a polarization splitting element is accommodated in the optical paths of a multi-frequency randomly polarized input light signal, to thereby produce said multi-frequency input light in the form of two spatially separated input light components of orthogonal polarization directions, said first tunable frequency coupling element being accommodated in the optical path of one of the two spatially separated light components of orthogonal polarization directions, light output through said first and second output channels being of one linear polarization;

an additional first tunable frequency coupling element for receiving the other light component of the two spatially separated light components of orthogonal polarization directions, and two outputs associated with two additional spatially separated optical paths, respectively, the first additional coupling element being operable to split light input thereto into two light components propagating through said first and second additional optical paths, respectively, the first additional light component comprising at least a portion of power of a selected frequency band of the input light, and the second additional light component comprising the remaining portion of the selected frequency band an all other frequency bands of the input light;

an additional phase adjusting element accommodated in the first additional optical path and operable to affect the phase of light propagating therethrough, thereby adjusting a phase delay between the first and second additional optical paths;

an additional second tunable frequency coupling element having two inputs associated with the two additional optical paths, respectively, and first and second additional outputs associated with first and second additional output channels, respectively, the second additional frequency coupling element being responsive to the phase delay between the first and second additional optical paths to either combine the first and second additional light components to propagate through the first additional output channel, or direct all the power of the selected frequency band to the second additional dropping/adding output channel and direct all other frequency components of the input light to the first additional output channel, light output through the first and second additional output channels being of the other linear polarization, as compared to that of said first and second output channels, a first polarization combiner for combining said first output channel and said first additional output channel into a first output path for outputting randomly polarized light, and a second polarization combiner for combining said second output channel and said second additional output channel into a second output path for outputting randomly polarized light.

* * * * *